United States Patent
Rose et al.

(10) Patent No.: US 9,573,111 B1
(45) Date of Patent: Feb. 21, 2017

(54) HIGH PURITY OZONE GENERATOR FOR OPTICS CLEANING AND RECOVERY

(71) Applicant: KLA-Tencor Corporation, Milpitas, CA (US)

(72) Inventors: Garry A. Rose, Livermore, CA (US); Gildardo R. Delgado, Livermore, CA (US); H. Steven Larson, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 466 days.

(21) Appl. No.: 13/935,765

(22) Filed: Jul. 5, 2013

Related U.S. Application Data

(60) Provisional application No. 61/669,478, filed on Jul. 9, 2012.

(51) Int. Cl.
*B01J 19/12* (2006.01)

(52) U.S. Cl.
CPC .................. *B01J 19/123* (2013.01)

(58) Field of Classification Search
CPC ......... A61L 2/202; C02F 1/32; G02B 27/0006
USPC .......................... 422/186.3, 292; 204/157.5
See application file for complete search history.

(56) References Cited

U.S. PATENT DOCUMENTS

| | | | |
|---|---|---|---|
| 6,178,973 B1 | 1/2001 | Franca et al. | |
| 6,252,648 B1 | 6/2001 | Hase et al. | |
| 6,824,693 B1 * | 11/2004 | Sauska | A61L 2/202 |
| | | | 210/192 |
| 7,251,014 B2 | 7/2007 | Hase | |
| 7,514,015 B2 | 4/2009 | Elliott et al. | |
| 7,663,121 B2 | 2/2010 | Nowak et al. | |
| 2009/0035586 A1 | 2/2009 | Cangemi et al. | |
| 2009/0109411 A1 | 4/2009 | Sewell et al. | |

FOREIGN PATENT DOCUMENTS

| | | |
|---|---|---|
| JP | 2000066003 | 3/2000 |
| JP | 2000126704 | 5/2000 |
| JP | 2003344601 | 12/2003 |
| JP | 2004267951 | 9/2004 |
| JP | 2006032991 | 2/2006 |
| WO | 0041225 | 7/2000 |
| WO | 2006121585 | 11/2006 |

OTHER PUBLICATIONS

Author: Roger W. C. Hansen et al. Title: Ultraviolet/ozone cleaning of carbon-contaminated optics Source: http://www.opticsinfobase.org/ao/abstract.cfm?URI=ao-32-33-4114 Publication Details: Applied Optics / vol. 32, No. 22/ Aug. 1, 1993.

(Continued)

*Primary Examiner* — Sean E Conley
(74) *Attorney, Agent, or Firm* — Simpson & Simpson, PLLC

(57) ABSTRACT

An apparatus for producing a high purity stream of ozone including a reaction chamber having an inlet and an outlet, a gaseous feed stream having a first purified component and an ultraviolet source. The gaseous feed stream enters the reaction chamber through the inlet, the first purified component includes oxygen, the ultraviolet source forms ozone from the oxygen, and the ozone exits the reaction chamber through the outlet.

9 Claims, 2 Drawing Sheets

(56) References Cited

OTHER PUBLICATIONS

Author: Toshihisa Anazawa et al. Title: Novel Ozone-based Cleaning Technique for EUV Masks and Optics Carbon Contamination Source: http://www.sematech.org/meetings/archives/litho/8653/poster/P051_Anazawa_MIRAI-SELETE.pdf Present affiliation: Toppan Printing Co.,Ltd., EUVL Symposium, 2009.
Author: R.E. Robinson et al. Title: Removing Surface Contaminants from Silicon Wafers to Facilitate EUV Optical Characterization Source: http://www.physics.byu.edu/faculty/allred/cv/00-04Publ%5CSVC04.pdf Publication Details: 2004 Society of Vacuum Coaters 05/856-7188, 47the Annual Technical Conference Proceedings (Apr. 24-29, 2004).
Author: John R. Vig et al. Title: UV/Ozone Cleaning of Surfaces Publication Details: IEEE Transactions on Parts, Hybrids, and Packaging, vol. PHP-12, No. 4, Dec. 1976.
Company: FHR Analgenbau Gmbh Title: Presentation UV-Ozone Cleaning Source: http://www.annealsys.com/docs/UV_Ozone_cleaning-02-05-10-33. Date unknown.
Company Product: Technovision Inc Title: 12 inch wafer UV Ozone Cleaner UV-312 Source: http://jp116284739.trustpass.alibaba.com/product/115844122-102961105/12_inch_wafer_UV_Ozone_Cleaner_UV_312.html Date unknown but last accessed on Oct. 31, 2013.

* cited by examiner

HIGH PURITY OZONE GENERATOR FOR OPTICS CLEANING AND RECOVERY

CROSS-REFERENCE TO RELATED APPLICATIONS

This patent application claims the benefit under 35 U.S.C. §119(e) of U.S. Provisional Patent Application No. 61/669,478 filed Jul. 9, 2012, which application is incorporated herein by reference.

FIELD OF THE INVENTION

The present invention broadly relates to an enhanced means for cleaning optical assemblies. More specifically, the present invention relates to an isolated chamber comprising an ultraviolet (UV) light source used to generate high purity ozone which ozone is then delivered to an optical element for purposes of cleaning the optical element.

BACKGROUND OF THE INVENTION

Ultraviolet light can drive both useful and detrimental chemistry. Useful chemistry can include activating oxygen, e.g., forming ozone, which activated oxygen can subsequently be used for other purposes such as cleaning optics. It should be noted that although the activation of oxygen may be desirable, the activated oxygen may have some detrimental effects such as attacking adhesive polymers. Detrimental chemistry driven by UV light alone, i.e., without the oxygen, can include degrading polymers and turning contaminants into graphite.

Optical assemblies are used in a wide variety of industries. Through the course of fabrication, assembly and operation, the optical assemblies and optical elements included therein are exposed to a number of contaminants. The contaminants affect both the performance and the overall life span of the assembly and the discreet elements. While current cleaning techniques are largely effective, the UV light in the current method can cause deposits to form on the optical assembly and/or elements, e.g., graphite deposits, thereby causing permanent damage and shortened lifespans.

The current standard in cleaning optical assemblies involves ozone generation by passing UV light through the optical assembly while simultaneously passing an oxygen containing purge gas through the optical assembly. Thus, diatomic oxygen is exposed to ultraviolet radiation within the optical assembly. Typically, optical assemblies have an ultraviolet light source built into the unit and a purge gas stream containing oxygen gas flowing through the optical assemblies. Ozone is generated when the purge gas stream, containing oxygen, is introduced into the assembly and is exposed to UV light. The oxygen reacts with the UV light causing the formation of ozone and oxygen radicals in the optical assembly. These two components, ozone and oxygen radicals, are powerful oxidants resulting in an effective cleaning agent.

While the ozone and oxygen radicals clean the optical assembly, there are a number of side effects. For example, the adhesives in the optical assembly undergo accelerated degradation, i.e., UV light causes accelerated decomposition of adhesive polymers. This, in combination with the already high oxidation effect of the ozone and oxygen radicals, causes the adhesives to degrade at an accelerated rate, significantly decreasing the life span of the optical assembly. Moreover, the current technology can cause graphite deposits on an optical element, contributing to decreased lifespan of the optical assembly. The reaction between the contaminants and ultraviolet light causes the formation of graphite. The graphite gets deposited on the optic element, e.g., a lens. However, there is currently no way of easily removing the graphite from the lens without potential further damage to the lens; therefore, the deposit can be effectively permanent. Graphite deposits absorb UV light during operation and can cause permanent coating damage, i.e., the performance of the lens is decreased. Furthermore, the propagation of the ultraviolet light into the optical assembly makes this method of ozone generation ineffective in cleaning the assembly walls. The ultraviolet light generally enters at the top of the optical assembly, e.g., above the lens. The purge stream is directed around the optic. As the ozone is created, it cleans the wall of the assembly and the top of the lens in the general vicinity of the entry point for the purge stream.

Although ozone may remain stable for a reasonable length of time, i.e., it can travel some distance, oxygen radicals are very reactive and will react with the first surface contacted. At times, the ozone will convert to diatomic oxygen before it can reach the small crevasses between the adhesive or the underside of the lens. Therefore, because the ozone may break down before it can spread to the entire assembly, the known methods are ineffective in cleaning the entire optical assembly.

The generation of ozone is known in the art. In fact, ozone is the preferred method of cleaning in many industrial processes. However, ozone is not stable enough to enable bulk storage and transportation. Therefore, ozone must be produced near its location of use. Existing methods of generating ozone are generally effective and permit cleaning in an industrial setting; however, the known methods of ozone generation for optical assembly cleaning have several side effects that decrease the life span of the optical assembly. For example, known methods of ozone generation produce "dirty" ozone which includes contaminants that drive the contamination of optics that contact the "dirty" ozone. Furthermore, ozone is of great importance in an industrial setting as it is highly effective in removing contaminants, especially spores and microbes.

Thus, there is a long felt need for an optimized high purity ozone generating assembly constructed completely of industry standard materials used for the cleaning and recovery of optical assemblies which ozone generating assembly produces ozone that does not leave behind harmful contaminants.

BRIEF SUMMARY OF THE INVENTION

The present invention broadly comprises both an apparatus and method for the treatment of an optical assembly through the generation of high purity ozone without the introduction of UV light and its deleterious effects into the optical assembly. The high purity ozone generator produces ozone outside of the optical assembly, effectively increasing the life span of the optical assembly and the optical elements included therein.

Broadly, the present invention comprises an apparatus for producing a high purity stream of ozone including a reaction chamber having an inlet and an outlet, a gaseous feed stream having a first purified component and an ultraviolet source. The gaseous feed stream enters the reaction chamber through the inlet, the first purified component includes oxygen, the ultraviolet source forms ozone from the oxygen, and the ozone exits the reaction chamber through the outlet.

Moreover, the present invention also broadly comprises an optical module including a high purity ozone generator and at least one optical assembly. The high purity ozone generator includes a reaction chamber having an inlet and an outlet, a gaseous feed stream having a first purified component and an ultraviolet source. The gaseous feed stream enters the reaction chamber through the inlet, the first purified component includes oxygen, the ultraviolet source forms ozone from the oxygen, and the ozone exits the reaction chamber through the outlet. The at least one optical assembly is coupled to the high purity ozone generator and adapted for receiving the ozone from the outlet. The ozone cleans the at least one optical assembly.

Still yet further, the present invention also broadly comprises a method of providing a high purity ozone stream to an optical assembly including: a) purifying a first gaseous feed stream to form a first purified gaseous stream, the first gaseous feed stream including oxygen; b) transferring a purified purge stream to a reaction chamber, wherein the purified purge stream includes the first purified gaseous stream, the reaction chamber including an inlet and an outlet, and the purified purge stream is transferred to the reaction chamber via the inlet; c) energizing an ultraviolet source to transmit ultraviolet light energy, wherein the ultraviolet source is positioned within the reaction chamber; d) exposing the purified purge stream to the ultraviolet light energy to form ozone; and e) transferring the ozone to the optical assembly via the outlet.

Accordingly, it is the objective of the invention to provide an ozone generator, wherein the ultraviolet radiation does not come in contact with the optical element, achieved by having the ultraviolet light in a separate chamber and pumping the resulting ozone into the optical assembly.

It is the primary object of the invention to have a high purity ozone generator that is portable to service optical assemblies in an industrial setting.

It is a further object of the invention to have a high purity ozone generator that can be used as a stationary service unit to service parts prior to shipment.

It is still another object of the invention to have a high purity ozone generator constructed as a sub-assembly to or within an optical assembly, wherein each optical assembly in a system has a discreet ozone generator built-in.

These and other objects, features, and advantages of the present invention will become apparent in view of the following detailed description in view of the drawings and appended claims.

BRIEF DESCRIPTIONS OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "reaction chamber" is intended to mean a hollow enclosed form designed to maintain the inlet gas streams within the system while preventing entry of contaminants into the system. It should also be appreciated that the term "purified component" is intended to mean any gas composition that has gone through a process to remove contaminants. Such purification process may include filtration, adsorption, and/or a scrubber process. Further, it should be appreciated that the term "clean dry air" is intended to mean air that has been purified to remove impurities, such that the impurity concentration is less than one-part-per-billion. Impurities of clean dry air include $H_2O$, $CO$, $CO_2$, non-methane hydrocarbons (NMHC), Acids, Bases, Organics, and Refractory Compounds. Clean dry air comprises about 78% by vol. nitrogen ($N_2$), about 21% by vol. oxygen ($O_2$), with the balance being inert gases. Further still, it should be appreciated that the term "feedthrough" is intended to mean an aperture in the reaction chamber in which a hollow tube is fixedly secured. An electrical source passes through the feedthrough thereby powering an ultraviolet light without exposing electrical components to the gaseous components within the chamber.

Although any methods, devices or materials similar or equivalent to those described herein can be used in the practice or testing of the invention, the preferred methods, devices, and materials are now described.

Figure 1:
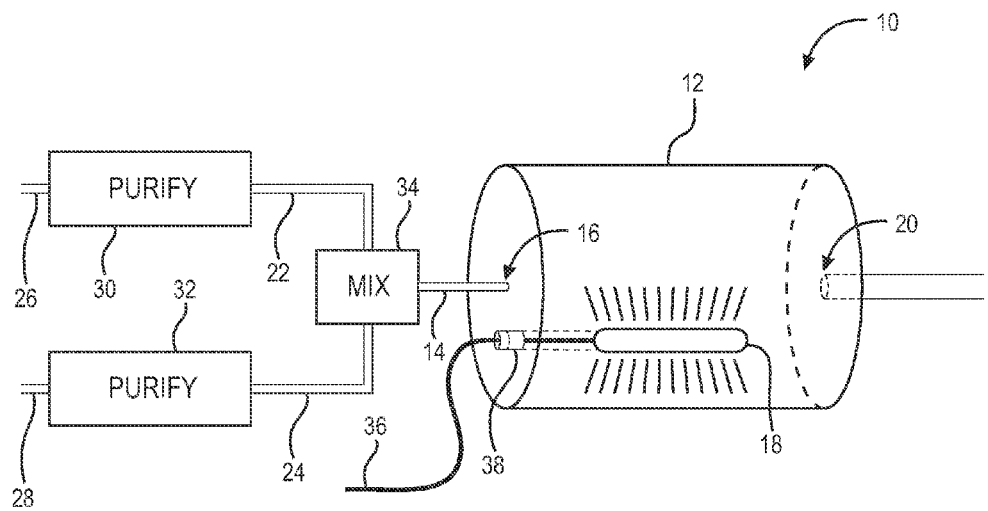
FIG. 1 is a schematic diagram of an embodiment of a present invention high purity ozone generating apparatus.

Adverting now to the figures, FIG. 1 shows a schematic diagram of an embodiment of a present invention high purity ozone generating apparatus, i.e., apparatus 10. Apparatus 10 comprises reaction chamber 12 which receives gaseous feed stream 14 via inlet 16. Ultraviolet light source 18 is positioned within chamber 12, and gas entering chamber 12 via inlet 14 exits via outlet 20. Reaction chamber 12 is a hollow form. In a preferred embodiment, reaction chamber 12 is cylindrical in shape. However, reaction chamber 12 may take other forms of common geometric shapes including, but not limited to, a hollow rectangular prism, a hollow cone, a hollow sphere, a hollow prism, a hollow pyramid, a hollow cube, a hollow ellipsoid, a hollow spheroid, a hollow barrel shape. Further, in a preferred embodiment, reaction chamber 12 is formed of stainless steel due to cost, ease of access and compatibility with ozone and oxygen radicals. However, reaction chamber 12 may be formed of any industrial standard material compatible with ozone and oxygen radicals including, but not limited to, aluminum, nickel plated aluminum, ceramic, glass or a combination thereof.

Inlet 16 and outlet 20 are also constructed of an industry standard material compatible with ozone and oxygen radicals including, but not limited to stainless steel, glass, aluminum, nickel plated aluminum, ceramic, or a combination thereof. Inlet 16 is designed to receive a purified purge gas stream that includes oxygen. Further, inlet 16 receives gaseous feed stream 14 including first purified gaseous stream 22. First purified gaseous stream 22 comprises oxygen and may, in some embodiments, further comprise inert gas. Furthermore, gaseous feed stream 22 may, in some embodiments, comprise second purified gaseous stream 24. First and second purified gaseous streams, 22 and 24, respectively, are mixed to form gaseous feed stream 14, i.e., a purified purge stream. Outlet 20 is adapted for receiving and transporting high purity ozone.

First and second gaseous feed streams 26 and 28, respectively, pass through gaseous purifiers 30 and 32, respectively, to form first and second purified gaseous streams, 22 and 24, respectively. In embodiments using only a single purified gaseous stream, the purified gaseous stream. e.g., first purified gaseous stream 22, directly enters chamber 12 via inlet 14 after passing through purifier 30. In embodiments using two purified gaseous streams, e.g., first and second purified gaseous streams 22 and 24, respectively, each purified gaseous stream enters mixer 34 wherein the two streams are blended, and then subsequently enter chamber 12 via inlet 16. The purification process removes any contaminants from the gaseous steam. As used herein, a contaminant is any component other than oxygen and inert gases. Examples of such gas purification devices are well known in the art.

Ultraviolet light source 18 is energized via power leads 36. Reaction chamber 12 is adapted to receive power leads 36 via feedthrough 38. The purpose of feedthrough 38 is to shield power leads 36 from exposure to the ultraviolet source. By constructing a cylindrical enclosure that runs from the outside wall of reaction chamber 12 to the base of ultraviolet light source 18, ultraviolet light source 18 can be energized without exposing power leads 36 to ultraviolet light. Feedthrough 38 is constructed from an industry standard material including, but not limited to, stainless steel, glass, aluminum, nickel plated aluminum, ceramic, or a combination thereof. It should be appreciated that although only a single feedthrough 38 is depicted in the drawings, more than one feedthrough is also possible, e.g., two or more, and such configurations are within the scope of the claimed invention.

Figure 2:
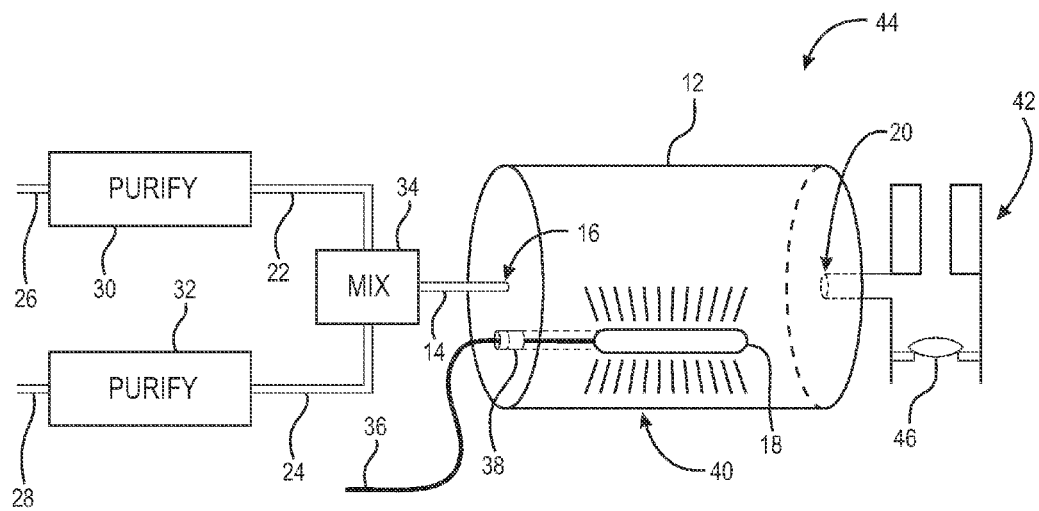
FIG. 2 is a schematic diagram of an embodiment of a present invention optical assembly.

FIG. 2 depicts high purity ozone generator 40, as described supra, in a module with optical assembly 42. Together, high purity ozone generator 40 and optical assembly 42 together form an embodiment of optical module 44. High purity ozone generator 40 is coupled to optical assembly 42 via outlet 20. The distance between high purity ozone generator 40 and optical assembly 42 should be as short as reasonably possible. Due to the highly unstable characteristic of ozone and oxygen radicals, the highest degree of cleaning is done closest to the sight of ozone production.

Optical assembly 42 includes at least one optical element, i.e., lens 46. Further, optical assembly 42 may also include a light source and a gas stream, e.g., a purge gas stream. Lens 46 can be attached to the walls of the optical assembly using an adhesive, as is well known in the art. It should be appreciated that although only a single optical assembly 42 is coupled to high purity ozone generator 40, more than one optical assembly may be coupled to generator 40, and such arrangements are within the spirit of the claimed invention.

Figure 3:
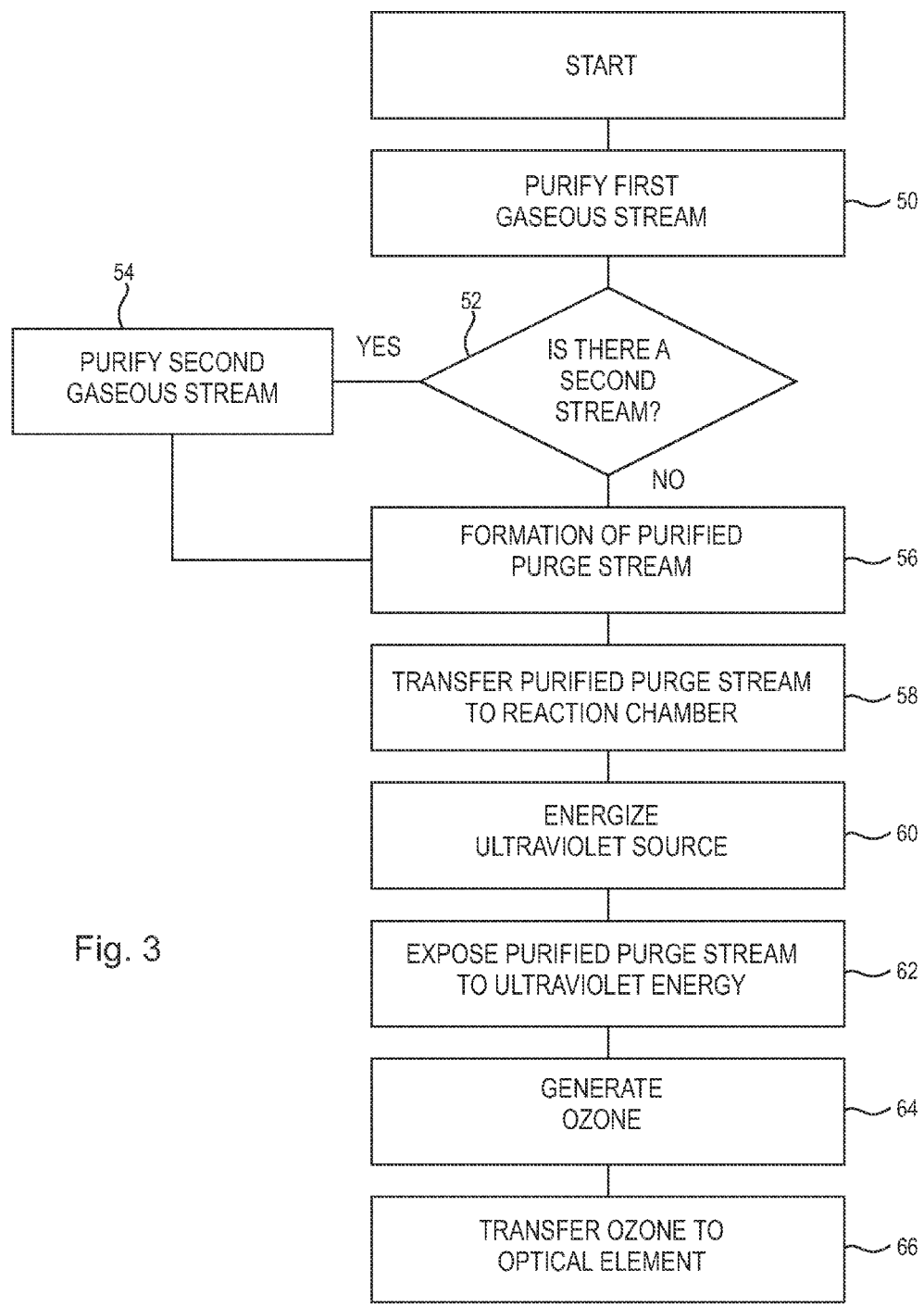
FIG. 3 is a flow chart describing an embodiment of a present invention method of providing a high purity ozone stream to an optical assembly.

FIG. 3 depicts an embodiment of a present method of generating high purity ozone. At the onset, first gaseous feed stream 26 goes through a purifying process to become first purified gaseous stream 22. (Step 50). First purified gaseous stream 26 includes oxygen, and may also include an inert gas. Next, in embodiments comprising a second gaseous feed stream 28, second gaseous feed stream 28 goes through a purifying process to become second purified gaseous stream 24. (Steps 52 and 54). Then, first and second purified gaseous streams, 22 and 24, respectively, are mixed together to form purified purge stream 14. (Step 56). Once mixed, purified purge stream 14 is injected into reaction chamber 12 via inlet 16. (Step 58). In reaction chamber 12. ultraviolet light source 18 is energized via power leads 36 thereby producing ultraviolet light. (Step 60). The oxygen from purified purge stream 14 reacts with the ultraviolet light creating ozone. (Steps 62 and 64). The formed ozone is injected through outlet 20 into optical assembly 42. (Step 66). In optical assembly 42, the ozone cleans lens 46 and the walls of assembly 42.

It should be appreciated that due to the characteristics of ozone and oxygen radicals, use of these components is difficult. As described above, ozone and oxygen radicals breakdown quickly under normal circumstances. Applicants have serendipitously found that balancing the amount of oxygen and other inert gases in the initial feed stream improves the quantity of ozone formed thereby maximizing the length of time ozone will remain in the outgoing stream from the reaction chamber. Additionally, careful selection of materials of construction for the reaction chamber, inlet and outlet, maximize the length of time ozone remains in the outgoing stream from the reaction chamber, thereby maximizing the cleaning effect the stream provides for any associated optical element. Moreover, use of high purity gaseous feed streams minimizes the amount of contamination of the various optical elements in contact with the ozone and oxygen radicals purposed in the present invention ozone generator. The present invention system and method cleans by using ozone only and does not clean optical elements using UV light. Although the cleaning process may take longer using this technique, all surfaces are cleaned, including those that would not be accessible by UV light using known cleaning techniques. Such an arrangement results in a cleaner assembly, as opposed to merely cleaning optics surfaces.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS

10 Apparatus
12 Reaction Chamber
14 Gaseous Feed Stream/Purified Purge Stream
16 Inlet
18 Ultraviolet Source
20 Outlet
22 First Purified Gaseous Stream
24 Second Purified Gaseous Stream
26 First Gaseous Feed Stream
28 Second Gaseous Feed Stream
30 First Purifier
32 Second Purifier
34 Mixer
36 Power Leads
38 Feedthrough
40 High Purity Ozone Generator
42 Optical Assembly 44 Optical Module
46 Optical Element/Lens

What we claimed is:

1. An optical module comprising:
    a high purity ozone generator comprising:
        a reaction chamber comprising an inlet and an outlet;
        a gaseous feed stream comprising a first purified component; and
        an ultraviolet source;
        wherein the gaseous feed stream enters the reaction chamber through the inlet, the first purified component comprises oxygen, the ultraviolet source forms ozone from the oxygen, and the ozone exits the reaction chamber through the outlet; and
    at least one optical assembly comprising at least one lens, coupled to the high purity ozone generator and adapted for receiving the ozone from the outlet,
    wherein the ozone cleans the at least one optical assembly.

2. The optical module of claim 1 wherein the reaction chamber comprises a hollow form.

3. The optical module of claim 1 wherein the hollow form is selected from the group consisting of: a hollow cylinder, a hollow rectangular prism, a hollow cone, a hollow sphere, a hollow prism, a hollow pyramid, a hollow cube, a hollow ellipsoid, a hollow spheroid, and a hollow barrel shape.

4. The optical module of claim 1 wherein the reaction chamber is formed from stainless steel, glass, aluminum, nickel plated aluminum, ceramic, or a combination thereof.

5. The optical module of claim 1 wherein the first purified component is selected from the group consisting of: oxygen, nitrogen, a noble gas and clean dry air.

6. The optical module of claim 1 wherein the gaseous feed stream further comprises a second purified component mixed with the first purified component.

7. The optical module of claim 1 wherein the ultraviolet source comprises power leads and the reaction chamber further comprises at least one opening adapted for receiving the power leads.

8. The optical module of claim 1 wherein the at least one opening comprises a feedthrough positioned therein, the feedthrough formed from stainless steel, glass, aluminum, nickel plated aluminum, ceramic, or a combination thereof.

9. The optical module of claim 1 wherein the outlet is adapted for exhausting the high purity stream of ozone from the reaction chamber and the outlet is formed from stainless steel, glass, aluminum, nickel plated aluminum, ceramic, or a combination thereof.

* * * * *